United States Patent [19]

Bordet et al.

[11] Patent Number: 4,555,881
[45] Date of Patent: Dec. 3, 1985

[54] STACK, PARTICULARLY ATMOSPHERIC COOLING TOWER

[75] Inventors: René Bordet, Courbevoie; Yves Grovalet, Chaville; Lionel Caudron, Croissy sur Seine; Marius Diver, Les Essarts Le Roi, all of France

[73] Assignee: Service National Electricite de France, Paris, France

[21] Appl. No.: 722,769

[22] Filed: Apr. 16, 1985

Related U.S. Application Data

[63] Continuation of Ser. No. 359,779, Mar. 19, 1982, abandoned.

[30] Foreign Application Priority Data

Mar. 20, 1981 [FR] France ................................ 8105641

[51] Int. Cl.[4] ................................................ E04B 1/36
[52] U.S. Cl. .......................................... 52/167; 52/245; 52/247; 261/108; 261/DIG. 11
[58] Field of Search ................ 52/245, 247, 249, 263, 52/274, 293, 294, 329, 339, 639, 167, 227, 228, 652; 261/DIG. 11, 108

[56] References Cited

U.S. PATENT DOCUMENTS

| 2,204,955 | 6/1940 | Beeby | 52/652 |
|---|---|---|---|
| 3,283,515 | 11/1966 | Potdorf | 52/167 |
| 3,468,087 | 9/1969 | Stancliffe | 261/DIG. 11 |
| 4,010,580 | 3/1977 | Mayr et al. | 52/245 |
| 4,032,604 | 6/1977 | Parkinson et al. | 261/DIG. 11 |
| 4,042,651 | 8/1977 | Gaurois | 261/DIG. 11 |
| 4,070,836 | 1/1978 | James et al. | 52/245 |
| 4,092,811 | 6/1978 | Lin et al. | 52/228 |
| 4,121,393 | 10/1978 | Renault et al. | 52/167 |
| 4,261,147 | 4/1981 | Agsten | 52/245 |
| 4,261,931 | 4/1981 | Rothrock et al. | 52/247 |
| 4,267,883 | 5/1981 | Maurice et al. | 261/DIG. 11 |
| 4,299,785 | 11/1981 | Fougea | 52/245 |
| 4,320,549 | 3/1982 | Greb | 52/167 |
| 4,388,785 | 6/1983 | Queffelec et al. | 52/245 |
| 4,481,156 | 11/1984 | LeCovec | 52/245 |

FOREIGN PATENT DOCUMENTS

| 53-6149 | 8/1979 | Japan | 52/167 |
|---|---|---|---|
| 556570 | 10/1943 | United Kingdom | 52/228 |

Primary Examiner—John E. Murtagh
Assistant Examiner—Andrew Joseph Rudy
Attorney, Agent, or Firm—Fleit, Jacobson, Cohn & Price

[57] ABSTRACT

The present invention relates to a stack, particularly an atmospheric cooling tower. The stack comprises a shell with double curvature and a bearing structure or seating for the shell; the shell is dissociated from the seating and presents in its lower part a rigid peripheral ring via which it rests on this seating. The invention is more particularly applicable to the production of atmospheric cooling towers.

20 Claims, 7 Drawing Figures

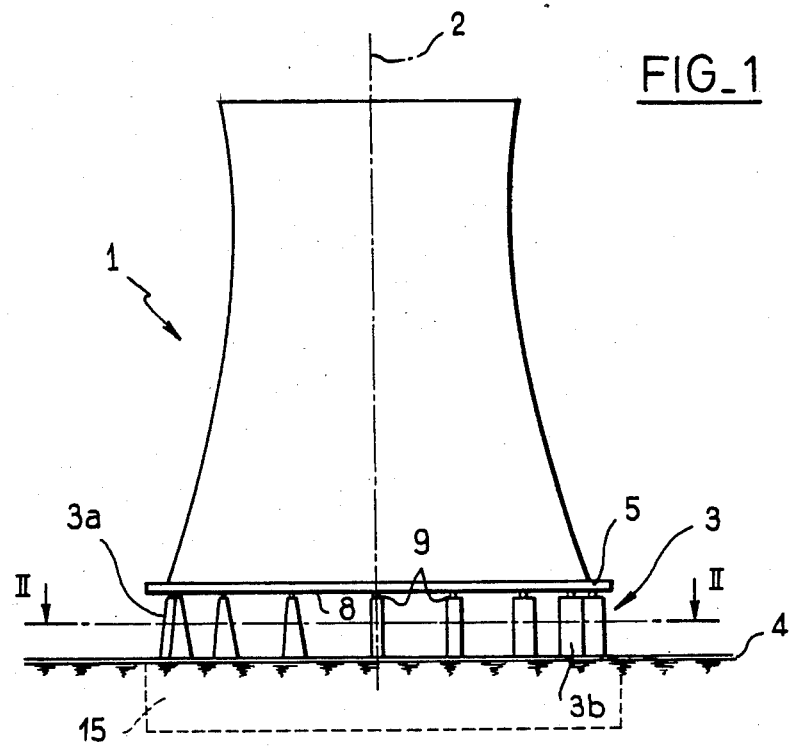
FIG_1
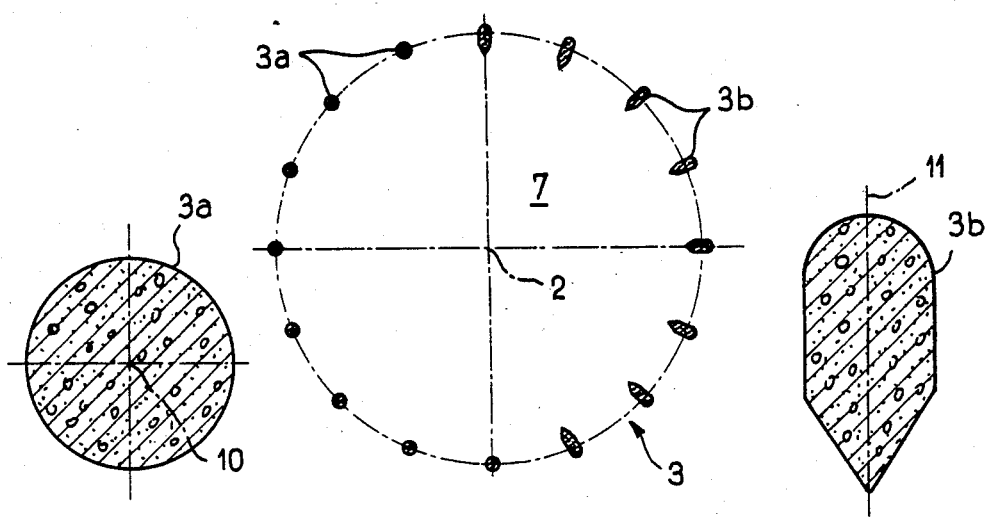
FIG_3  FIG_2
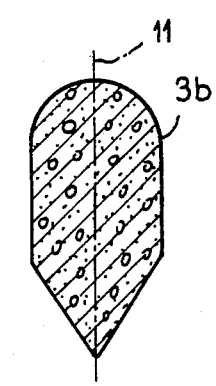
FIG_4

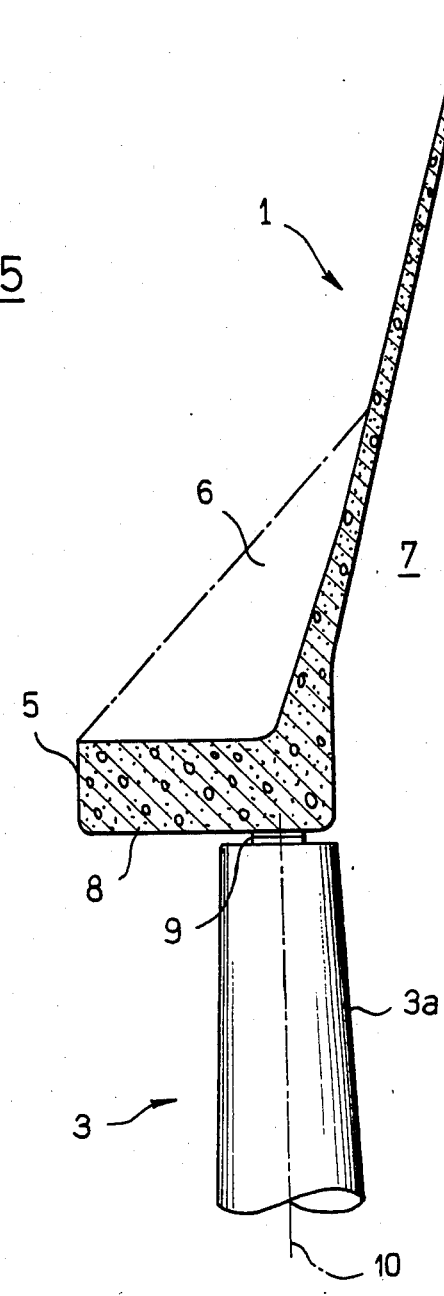
FIG_5

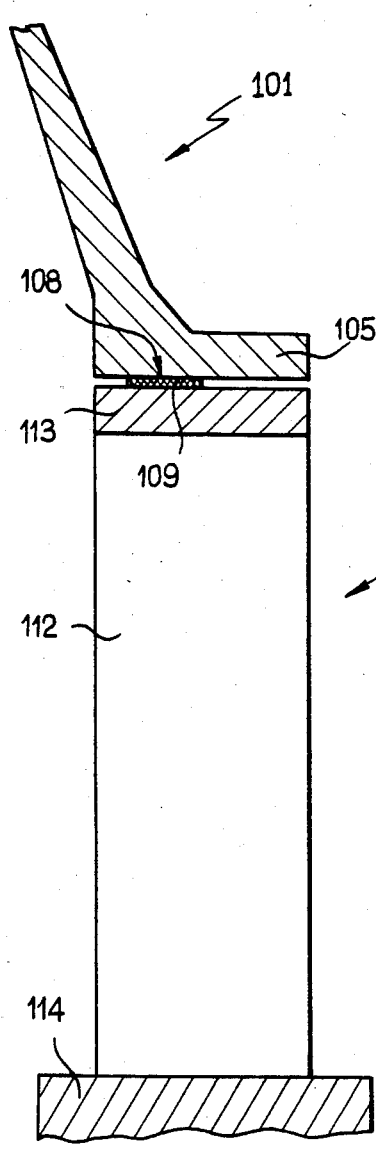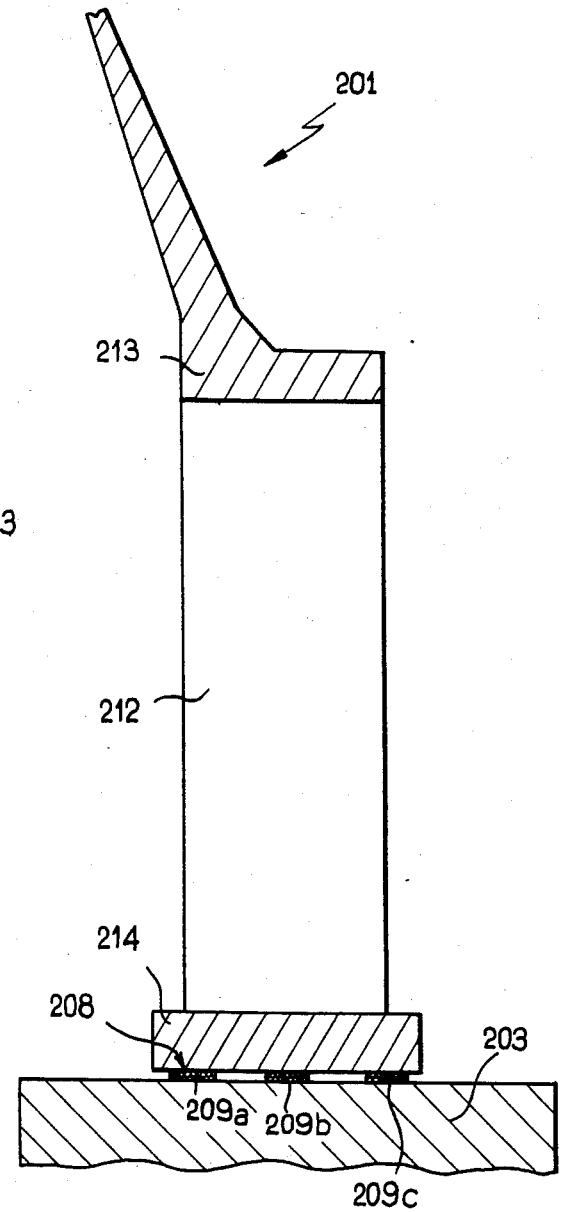
FIG_6  FIG_7

STACK, PARTICULARLY ATMOSPHERIC COOLING TOWER

This is a continuation of application Ser. No. 359,779, filed Mar. 19, 1982, now abandoned.

The present invention relates to a stack and particularly but not exclusively to an atmospheric cooling tower.

In their most wide-spread form, such stacks comprise a shell made of reinforced concrete, with double curvature, generally in the form of hyperboloid of revolution about a vertical axis, with at their lower part an opening allowing admission of air with a view to ensuring a draught inside the stack; to this end, the shell is interrupted at a distance from the ground and extended to the foundations in the ground by posts inclined along the meridian lines, which may also be inclined in the plane tangential to the hyperboloid at this spot, and defining a bearing structure or seating in openwork lattice form; from the mechanical standpoint, these posts define with the shell and the foundations of the tower a single, perfectly integral structure.

An increase in the size of such structures leads to reinforcing their bearing structure, whilst functional imperatives, connected with a desire to reduce drops in pressure undergone by the air on entering, lead to reducing the obstacle which the posts oppose against the admission of the air, by reducing their overall cross section and reducing the turbulences which they tend to provoke in the entering air.

It is difficult to conciliate these imperatives and a resulting assembly approaches the reasonable limits of safety and cost.

It is an object of the present invention to propose a stack structure which overcomes these drawbacks.

To this end, the present invention proposes to dissociate the actual stack, essentially constituted by the shell of reinforced concrete, and the bearing structure or seating, and to rigidify the lower part of the shell by a rigid peripheral ring which takes up the shearing stress in the shell, balances the horizontal thrusts therein and transmits the shearing forces to the seating, on which the shell rests by this ring, if necessary via elastic supports.

The advantages of such a dissociation of the shell and the seating are numerous; certain are generally encountered whenever, in a structure, the bearing structure is dissociated from the borne structure, and others being specific to the case of stacks and in particular of atmospheric cooling towers.

In manner known per se, this dissociation makes it possible, by supports interposed between the borne structure, comprising the shell, and the bearing structure, which may be constituted by essentially vertical piers fast with the foundations of the tower, or, as a variant, by a base forming subfoundation, to compensate the differential settlings by a process currently used in the case of bridges whose bays rest on piers; for example, the possibility may be provided of introducing jacks between the bearing structure and the borne structure to introduce or add therein support blocks; other processes of compensation used in public works may of course also be chosen.

It is also possible to introduce anti-seismic supports which may filter the seismic excitation spectrum, between the borne structure and the bearing structure.

Another advantage consists in the possibility of calculating the shell independently of the characteristics of the ground, which leads to a certain degree of standardisation of the stacks.

More generally, the structure made according to the invention is constituted by two pure structures, namely the stack proper, essentially constituted by the shell, and the bearing structure, whose respective behaviours are known and which can be calculated with precision.

This advantage is particularly advantageous in the case of stacks used in atmospheric cooling towers, with a shell made of reinforced concrete which, in their presently known design, in the form of a single shell-post-ground structure, do not lend themselves to any empirical or theoretical method of calculation which can predict with sufficient precision the degree of safety before the risk of instability of form or blistering, the imprecision increasing as the ratio between the height of the posts and that of the stack increases.

When the structure according to the invention is adopted, in a first embodiment, the piers advantageously constitute the bearing structure and may be designed and calculated as brackets, subjected at their upper end to the efforts coming from the shell and embedded in their foundations.

As a variant, the piers are fast with the shell with which they constitute the borne structure, and rest on a seating forming a bearing structure, this seating then for example being constituted by a base forming sub-foundation, and fast with the foundations of the tower.

This results in that, in one or the other embodiment, the distance between the piers may be determined directly as a function of a calculation of optimization of the aerodynamism of the admission of air, consisting essentially in minimising the drops in pressure.

In this way, the replacement of the known lattice work of inclined posts extending the shell towards the annular foundation base, which posts cannot be designed and calculated as brackets since they form a single structure with their foundations and with the shell, by a structure according to the invention advantageously comprising vertical piers which may be more spaced apart, increases the thermal yield by increasing the surface of the admission of air and reducing the turbulence.

In a reverse step, it is possible by adopting the structure according to the invention, to accept a thermal yield equal to that of the conventional cooling towers and reduce the total height of the stack, replacing the conventional posts by a bearing structure dissociated from its seating.

The stack according to the invention, particularly for use in an atmospheric cooling tower, of the type comprising a shell with double curvature, made of reinforced concrete, and a bearing structure or seating for the shell, is characterised in that the shell is dissociated from the seating, and presents in its lower part a rigid peripheral ring via which it rests on the seating, said ring taking up the shearing stress in the shell, balancing the horizontal thrusts therein, and transmitting the shearing forces to the seating.

The invention will be more readily understood on reading the following description of two non-limiting embodiments given with reference to the accompanying drawings, in which:

FIG. 1 shows, in a first embodiment, a side elevation of an atmospheric cooling tower according to the invention, two variants being shown respectively in its left-hand and its right-hand part.

FIG. 2 shows a view of the seating in section through the plane II—II of FIG. 1.

FIGS. 3 and 4 show views in section through the same plane II—II to a scale larger than that of FIG. 2, of a pier of the type used respectively for the variant of the left-hand part and for the variant of the right hand part of FIGS. 1 and 2.

FIG. 5 shows a partial view of a section of the tower, through a plane including the axis of said tower, at the level of a support according to the variant illustrated in the left-hand part of FIGS. 1 and 2.

FIG. 6 shows a partial view of a section of the tower through a vertical plane passing between two supports, in a variant of the first embodiment, employing the so-called lattice girder process of construction.

FIG. 7 shows a partial view of a section of the tower through a vertical plane passing between two supports, in a second embodiment where the piers are an integral part of the borne structure.

Reference will firstly be made to the embodiments illustrated in FIGS. 1 to 5.

1 denotes a shell of reinforced concrete, with double curvature, for example in the form of hyperboloid of revolution about a vertical axis 2, this shell defining the stack proper;

3 denotes the bearing structure or seating of the shell, this seating 3 extending in the ground 4 by foundations 15. The seating has a first end and a second end.

According to the invention, the shell 1 is dissociated from the seating 3, i.e. adapted to withstand, independently of any interaction with the seating 3, the various forces and stresses to which it may be subjected, particularly the action of the wind; in particular, the shell 1, due to its own weight, is adapted to oppose the torque reaction imparted thereto by a theoretical maximum wind; it is calculated independently of the seating 3; if its own weight is insufficient, the torque reaction may be counteracted, as a safety precaution, by the use of tie-rods independent of the seating, associating the weight of the piers and the foundations and even that of the ground with that of the shell, these tie-rods being subjected solely to traction and intervening only for very strong winds (variant not illustrated).

The lower part of the shell 1 is in the form of a rigid pheripheral ring 5, of axis 2, via which the shell 1 rests on the seating 3; this ring 5, which takes up the shearing stress in the shell, balances the horizontal thrusts therein and consequently rigidifies the lower edge of the shell 1, may present any form compatible with aerodynamic requirements; it may form a projection projecting out of the shell 1, as in the example illustrated in FIG. 5, where it may, if necessary, be connected at the top to the rest of the shell by gusset plates such as 6; it may also penetrate partially into the interior 7 of the stack defined by the shell 1 to which it may also be connected by reinforcing gusset plates.

The shell 1 rests on its seating, by the ring 5, and particularly by the lower face 8 thereof, which is substantially flat and oriented transversely with respect to the axis 2, via supports 9 which may be elastic (for example made of elastomer) and are capable of transmitting the vertical and horizontal efforts allowing, by distorsion, the dilation of the structure under the action of the temperature; in certain cases, the use of fixed supports without distorsion, or any support of other type, may also be provided.

In the embodiment illustrated in FIGS. 1 to 5, due to its dissociation from the shell 1 at the level of supports 9, the seating 3 of the tower may be constituted by piers 3a in the left-hand part of FIGS. 1 and 2, in FIG. 3 and in FIG. 5, or 3b in the right-hand part of FIGS. 1 and 2 and in FIG. 4, respectively, designed and calculated as brackets, subjected at their upper end to the efforts coming from the shell via the ring 5, and particularly the shearing forces, and embedded in their foundations 15.

In the left-hand part of FIGS. 1 and 2, and in FIGS. 3 and 5, each pier 3a is in truncated form, of revolution about a vertical axis 10 which is particular thereto; in the right-hand part of FIGS. 1 and 2 and in FIG. 4, each pier 3b is in the form of a vertical wall, presenting its own mean vertical plane 11 including axis 2; in section through any horizontal plane, each of the walls 3b is preferably aerodynamic in form, inspired in the example illustrated from the so-called "drop of water" with symmetry with respect to the radial plane 11; other forms may of course be adopted, particularly when the stack must be constructed on a site where winds are strong each pier 3a, 3b having a first end and second end.

The foundations 15 of the seating 3 may be constituted as in the stacks of conventional type, by a single annular base common to all the piers such as 3a or 3b; however, due to the dissociation between the shell 1 and its seating 3 when the invention is carried out, and to the considerable ease resulting therefrom to compensate possible differential settling by replacing or modifying the thickness of the supports such as 9, isolated foundations may also be provided for each pier such as 3a or 3b, or for distinct groups of piers, which facilitates calculation of the foundations and simplifies production thereof.

A variant of this embodiment, illustrated in FIG. 6, consists in employing, for making the seating 103, the arrangement known as "lattice girder" where each of the piers 112 is connected to the others by circular horizontal spacer 113 and 114, in the form of rings. The upper spacer 113 connects all the upper parts of the piers; the lower spacer 114, which, in this embodiment, may be fast with the foundations of the tower, connects the bases of all the piers. The upper spacer 113 further serves as support for the shell 101, of the same design as shell 1 described above, whose rigid lower peripheral ring 105, in all points comparable with the ring 5 for rigidifying the shell 1, rests thereon by its lower face 108, via elastic supports 109.

In a second embodiment, shown in FIG. 7, the "lattice girder" construction has also been employed, where the piers 212 are connected by two circular rings 213 and 214 forming spacers. However, in this case, the piers 212, fast with the shell 201, form an integral part of the borne structure and the role of the rigid peripheral ring 5 or 105 is performed by the lower spacer 214, which rests via elastic supports 209a, 209b, 209c placed at the base of the piers, on the seating 203, in that case constituted by the foundations themselves. In this way, the borne structure comprising the shell 201 and the piers 212 is dissociated from the bearing structure or seating 203, and the advantages mentioned hereinabove are found again.

Of course, in this latter embodiment, it is possible to give the piers the forms which have been described as a variant of the first embodiment, and particularly those of a truncated cone, vertical radial wall, or the aerodynamic form mentioned above.

The atmospheric cooling tower illustrated constitutes, of course, only a non-limiting example for carrying out the invention. The invention is applicable to other types of stacks presenting an open work lattice form seating.

What is claimed is:

1. An atmospheric cooling stack comprising:
   a shell having double curvature, said shell being made of reinforced concrete,
   a seating separate from said shell said shell being spaced from said seating and said shell being supported by said seating;
   a rigid peripheral ring portion integral with said shell for resisting deformation of said shell due to external forces, said ring portion being located at a base of said shell and said ring portion taking up shearing stress in said shell, balancing horizontal thrusts in said shell and transmitting shearing forces to said seating, a lower face of said rigid peripheral ring portion being flat and extending beyond a periphery of said double curvature; and
   means interposed between said rigid peripheral ring and said seating for transmitting vertical and horizontal efforts of said shell to said seating and allowing thermal dilation of said shell.

2. The stack of claim 1, wherein said means is elastic.

3. The stack of claim 1, wherein the seating is constituted by essentially vertical piers.

4. The stack of claim 3, wherein the piers present a truncated radial shape extending about a vertical axis.

5. The stack of claim 1, wherein said seating is common to a plurality of vertical piers.

6. An atmospheric cooling tower comprising:
   a stack having double curvature and being open at opposite ends for passage of air therethrough;
   a rigid peripheral ring portion defined by one end of said stack for resisting deformation of said stack due to external forces by taking up shearing stress in said shell and balancing horizontal thrusts in said shell, a lower face of said rigid peripheral ring portion being flat;
   a foundation supported by the ground;
   seating means having a first end and second end, said seating means being separate from said stack, one end of said seating means supporting said stack and the second end of said seating means supporting by said foundation, said seating means includes a plurality of piers spaced around a periphery of said lower face of said rigid peripheral ring, a distance between each of said plurality of piers being determined to maximize admission of air into said first end of said stack to thereby reduce turbulence of air entering said first end of said stack; and
   support means interposed between said one end of said seating means and said lower face of said rigid peripheral ring portion for transferring vertical and horizontal efforts of said stack to said seating means and permitting thermal dilation of said stack.

7. An atmospheric cooling tower as in claim 6, wherein said plurality of piers are vertically oriented.

8. An atmospheric cooling tower as in claim 6, wherein the outer diameter of said rigid peripheral ring portion extends beyond the outer diameter of the double curvature of said stack.

9. An atmospheric cooling tower as in claim 7, wherein a height of said plurality of piers is substantially less than the height of said stack.

10. An atmospheric cooling tower as in claim 6, wherein said foundation is divided into sections which each support several piers.

11. An atmospheric cooling tower as in claim 6, wherein said foundation is divided into sections which each support individual piers.

12. An atmospheric cooling tower comprising:
    a stack having double curvature and being open at opposite ends for passage of air therethrough;
    a rigid peripheral ring portion defined by one end of said stack for resisting deformation of said stack due to external forces by taking up shearing stress in said shell and balancing horizontal thrusts in said shell, a lower face of said rigid peripheral ring portion being flat;
    a foundation supported by the ground;
    seating means having a first end and a second end, said seating means being separate from said stack, the first end of said seating means supporting said stack and the second end of said seating means supported by said foundation, said seating means includes a plurality of piers, a first circular spacer and a second circular spacer, one end of each of said plurality of piers being connected to said first circular spacer and the second end of each of said plurality of piers being connected to said second circular spacer, said second circular spacer being supported by said foundation, a distance between each of said plurality of piers being determined to maximize admission of air into said first end of said stack to thereby reduce turbulence of air entering said first end of said stack; and
    support means interposed between said first circular spacer and said lower face of said rigid peripheral ring portion for transferring vertical and horziontal efforts of said stack to said seating means and permitting thermal dilation of said stack.

13. An atmospheric cooling tower as in claim 12, wherein said second circular spacer is made fast with said foundation.

14. An atmospheric cooling tower as in claim 12, wherein said plurality of piers are vertically oriented.

15. An atmospheric cooling tower as in claim 12, wherein an outer diameter of said rigid peripheral ring portion extends beyond an outer diameter of the double curvature of said stack.

16. An atmospheric cooling tower as in claim 12, wherein the height of said plurality of piers is substantially less than a height of said stack.

17. An atmospheric cooling tower comprising:
    a stack having double curvature and being open at opposite ends for passage of air therethrough;
    a rigid peripheral ring portion defined by one end of said stack for resisting deformation of said stack due to external forces by taking up shearing stress in said shell and balancing horizontal thrusts in said shell, a lower face of said rigid peripheral ring portion being flat;
    seating means separate from said stack;
    a circular ring;
    a plurality of vertical piers having a first and second end, said vertical piers being connected at the first end to said rigid peripheral ring and connected at the second end to said circular ring, a distance between each of said plurality of piers being determined to maximize admission of air into said first end of said stack to thereby reduce turbulence of air entering said first end of said stack; and support means interposed between said circular ring and said seating means for transferring vertical and horizontal efforts of said stack to said seating means and to permit thermal dilation of said stack.

18. An atmospheric cooling tower as in claim 17, wherein said seating means comprises a foundation for said stack.

19. An atmospheric cooling tower as in claim 17, wherein said plurality of piers are vertically oriented.

20. An atmospheric cooling tower as in claim 17, wherein the outer diameter of said rigid peripheral ring portion extends beyond the outer diameter of the double curvature of said stack.

* * * * *